United States Patent [19]
Yamauchi

[11] Patent Number: 6,000,208
[45] Date of Patent: Dec. 14, 1999

[54] HEATER CONTROL APPARATUS FOR TEXTILE MACHINE

[75] Inventor: Toshio Yamauchi, Kyoto, Japan

[73] Assignee: Murata Kikai Kabushiki Kaisha, Kyoto, Japan

[21] Appl. No.: 09/177,562

[22] Filed: Oct. 23, 1998

[30] Foreign Application Priority Data

Nov. 14, 1997 [JP] Japan .................................. 9-313075

[51] Int. Cl.$^6$ .................................................. D01H 7/46
[52] U.S. Cl. .............................. 57/290; 28/249; 57/264; 57/284
[58] Field of Search ................................ 28/249; 57/290, 57/352, 284, 264, 265

[56] References Cited

U.S. PATENT DOCUMENTS

| 4,398,386 | 8/1983 | Endo ......................................... 57/290 |
| 4,456,818 | 6/1984 | McCollough et al. ..................... 57/284 |
| 5,408,730 | 4/1995 | Yamamoto ................................. 28/249 |
| 5,649,345 | 7/1997 | Menegatto ................................. 57/284 |

FOREIGN PATENT DOCUMENTS 48-6023  1/1973  Japan .

*Primary Examiner*—William Stryjewski
*Attorney, Agent, or Firm*—Armstrong, Westerman, Hattori, McLeland & Naughton

[57] ABSTRACT

To provide a heater control apparatus capable of checking, during initial installation, whether heaters and temperature sensors are connected together so as to be correctly paired, and whether the outputs from the temperature sensors are correct. The present invention is characterized in that a heater control apparatus comprises a large number of heaters, each provided so as to correspond to each of a large number of yarn processing units installed in parallel; a large number of temperature sensors each provided so as to pair with each of the heaters and detecting the temperature of the heaters; a large number of switches each provided so as to pair with each of the heaters and turning on and off the power to the heaters; a switch control device for sequentially turning on and off the large number of switches to sequentially provide power to the large number of heaters; and a combination determining device for determining whether a temperature sensor that has detected the temperature of an activated heater should be paired with said heaters.

5 Claims, 5 Drawing Sheets

HEATER CONTROL APPARATUS FOR TEXTILE MACHINE

FIELD OF THE INVENTION

The present invention relates to a heater control apparatus used for a textile machine such as a draw texturing machine, and in particular, to a heater control apparatus having a plurality of heaters and temperature sensors.

BACKGROUND OF THE INVENTION

If, for example, a draw texturing machine is used to process yarn at high temperature, the temperature of the heater is set so that yarn at the heater's outlet will be at the required temperature. With polyester yarn, for example, the temperature at the heater outlet is set at 190° C.~230° C. This temperature is set after taking into account factors such as yarn speed, yarn thickness (denier) and heater length. A heater control apparatus is conventionally provided in the draw texturing machine to adjust the heaters to a set temperature. To allow the heater control apparatus to function correctly, the individual heaters and temperature sensors must be paired together correctly.

When, however, a large number of heaters and temperature sensors are wired together, they may be connected so as to be incorrectly paired, causing the incorrectly paired heater to become excessively hot and melt the yarn.

The present invention is provided in view of this problem, and is intended to provide a heater control apparatus that can confirm during initial installation whether the heaters and temperature sensors are correctly paired, and whether the outputs from the temperature sensors are correct.

SUMMARY OF THE INVENTION

The present invention is characterized in that a heater control apparatus comprises a large number of heaters, each provided so as to correspond to each of a large number of yarn processing units installed in parallel, a large number of temperature sensors each provided so as to pair with each of the heaters and detecting the temperature of the heaters, a large number of switches each provided so as to pair with each of the heaters and turning on and off the power to the heaters, a switch control means for sequentially turning on and off the large number of switches to sequentially provide power to the large number of heaters and a combination determining means for determining whether a temperature sensor is correctly paired with an activated heater.

This configuration enables the operator to determine whether a larger number of heaters and temperature sensors are wired together so as to be correctly paired, thereby enabling the operator to easily confirm wiring accuracy and thus to prevent the excessive heater temperatures caused by incorrect wiring, which can cause yarn to melt.

In addition to the configuration of the above mentioned invention, the present invention is characterized in that the combination determining means has a calculating means that becomes active if it determines that the heaters and the temperature sensors are incorrectly combined together. If so, this calculating means calculates a value indicating the temperature sensors that has detected the temperature of the activated heaters.

This configuration enables the calculation of the value indicating which temperature sensor has detected an activated heater, thereby informing the operator of a wiring error form.

In addition to the configuration of the above mentioned invention, the present invention is characterized in that the apparatus has a display means for displaying, in a comparative format, the value indicating the activated heater and a value indicating the temperature sensor that has detected said activated heater.

This configuration enables the operator to determine the form of wiring errors so that they can be corrected promptly and reliably.

In addition to the configuration of the above mentioned invention, the present invention is characterized in that the apparatus has an output error detection means for turning off all heaters, in order to detect output errors from the temperature sensors.

This configuration enables an operator to easily confirm during installation of the heaters whether the outputs from the temperature sensors are correct, thereby preventing incorrect output from being generated by the temperature sensors during operation of the textile machine. dr

DETAILED DESCRIPTION OF THE PREFERRED EMBODIMENTS

Figure 1:
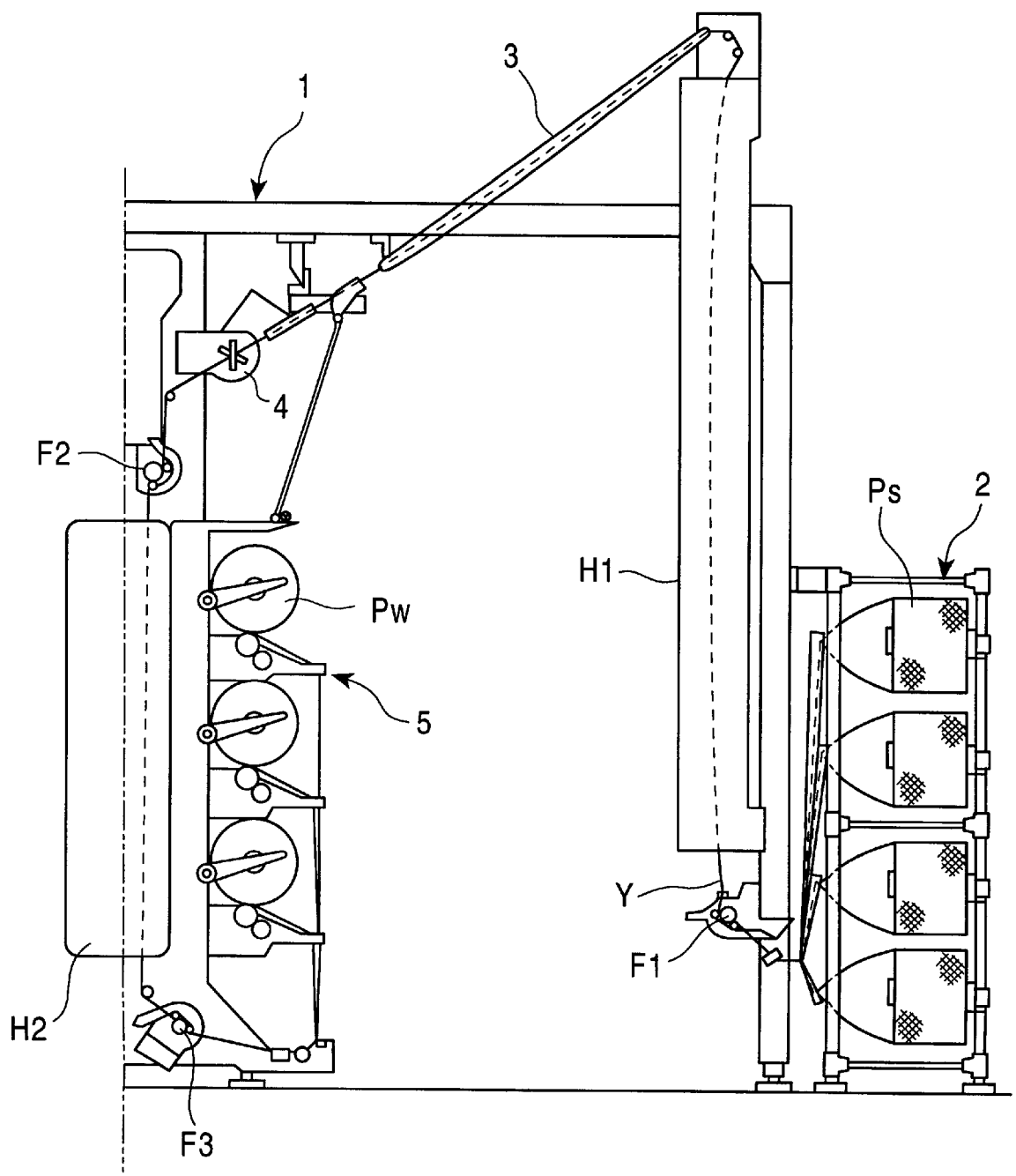
FIG. 1 schematically describes a draw texturing machine.

A heater control apparatus according to an embodiment of the present invention that is, for example, provided in a draw texturing machine is described below with reference to the drawings. The draw texturing machine comprises a plurality of false twisting units (i.e., yarn processing units) installed in parallel. The false twisting unit guides a filament yarn Y unwound from a yarn supply package Ps supported in a creel stand 2 provided along a frame 1 to a first feed roller F1, then guides the yarn filament Y to a second feed roller F2 via a primary heater H1 for texturing, a cooling plate 3 and a nip twister 4 while also drawing, twisting and thermally setting the yarn Y to make it bulky. It then further guides the yarn Y via a secondary heater H2 for setting to a winder 5, where the yarn Y is wound round a winding package Pw, as shown in FIG. 1.

Figure 2:
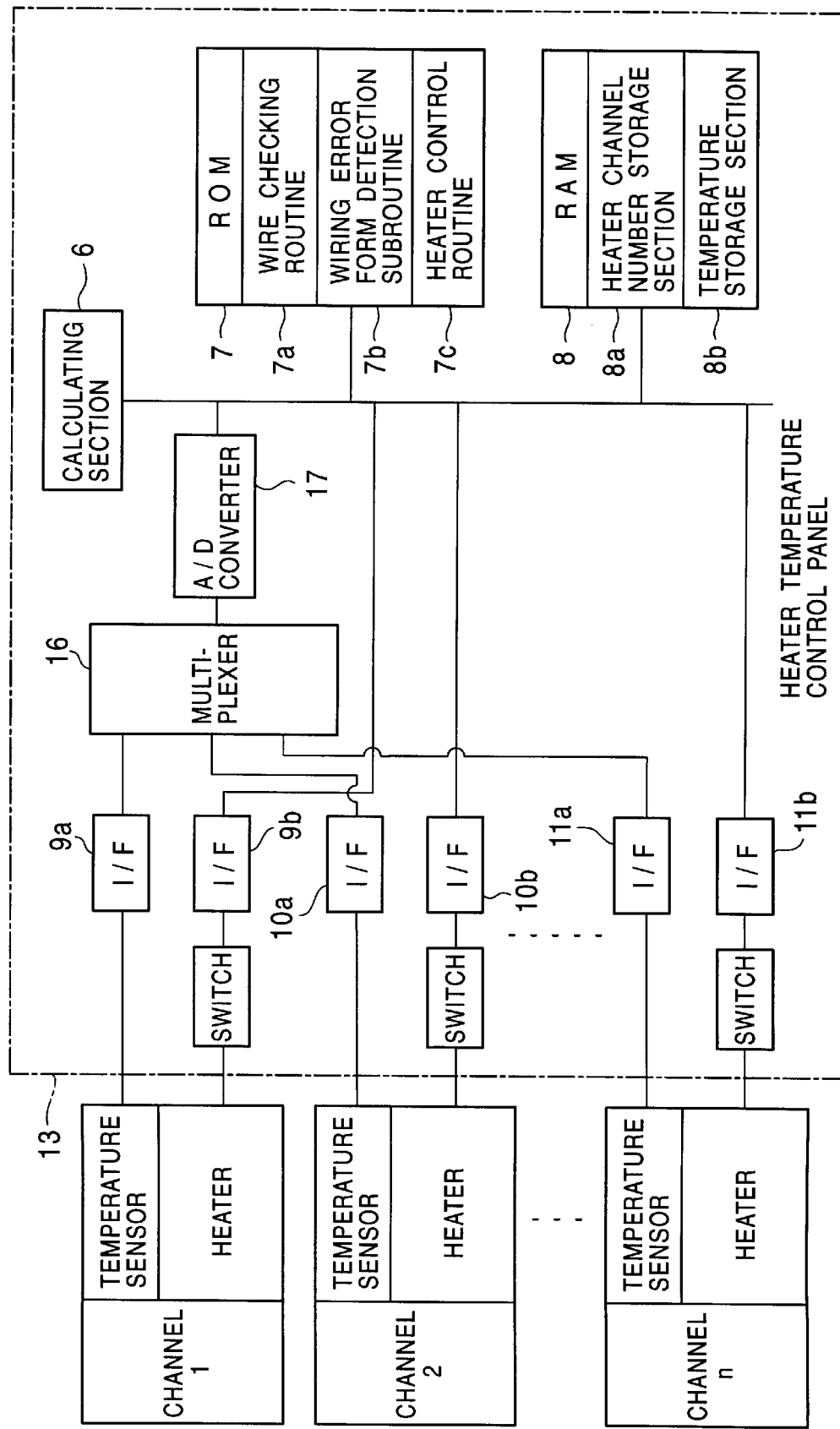
FIG. 2 describes a heater control apparatus.

Next, the integral part of the embodiment of the present invention is described with reference to the drawings. The heater control apparatus is provided in a main body control apparatus of the draw texturing machine and has a heater (a heater means) for thermally setting yarn, a switch (a switch means) for turning on and off the power to the heaters, a temperature sensor comprising a temperature sensor means, a switching and calculating means, a heater temperature control panel 13 comprising an output error detection means, and a display panel (i.e., a display means; not shown in the drawings) so that wiring errors can be checked by examining whether the heaters and the temperature sensors are connected together so as to be correctly paired, as shown in FIG. 2. A heater and temperature sensor are provided for each false twisting unit.

The heater temperature control panel 13 is equipped with I/F sections 9a, 9b~11a, 11b connected to the heaters and the temperature sensors, and a calculating section 6, a ROM 7, a RAM 8, a multiplexer 16 and an A/D converter 17 connected to the I/F sections 9a, 9b~11a, 11b via a signal bus 12 in order to detect wiring errors including switch defects.

A heater channel number storage section 8a that stores the number of each heater (hereafter referred to as a "heater channel number") is formed in the RAM 8 to store heater channel numbers. The RAM 8 also features a temperature storage section 8b, used to store the number of the temperature sensor (hereafter referred to as a "sensor channel number") and the temperature detected by the temperature sensor (hereafter referred to as "temperature data")

The ROM 7 stores a wiring checking routine 7a, a wiring error form detection subroutine 7b and a heater control routine 7c that controls the heaters during normal operation. These routines are executed by the calculating means 6 which is described below. The wiring checking routine 7a allows the apparatus to detect whether all temperature sensors are operating correctly and also to detect wiring errors. The wiring error form detection subroutine 7b allows the apparatus to detect wiring errors and to display, on a display panel, the heater channel number of an activated heater and the channel number of the temperature sensor detecting the temperature of the activated heater (wiring error form).

The calculating section 6 transmits an output stop signal to all heater switches which turns off the output from all heaters, and sends a temperature detection command to all temperature sensors via the multiplexer 16. When the temperature sensor detects a high temperature, the disconnection (open) is displayed. On the other hand, when the temperature sensor detects a negative temperature, the reverse connection of the temperature sensor is displayed. The temperature sensor is allowed to detect the temperature despite the output stop signal being transmitted to the heater switch, because the temperature sensor mistakenly detects a high or a negative temperature regardless of an increase in heater temperature if the wiring is disconnected (open) or if the temperature sensor is reversely connected. If the wiring is correct, the outputs from all heaters are turned off, causing the temperature sensor to detect the room temperature.

Next, the calculating section 6 sends an output start signal to the heater switch to turn on the output from the heater in channel n in order to increase the temperature of the heater up to a predetermined value, and stores the heater channel number n in the heater channel storage section 8a. The calculating section 6 then transmits a temperature detection command to the temperature sensor in channel n and stores the obtained temperature data from the temperature sensor and sensor channel number n in temperature storage section 8b. Furthermore, the calculating section 6 reads the sensor channel number n and temperature data from the temperature storage section 8b, and reads the heater channel number n from the heater channel storage section 8a, and if a wiring error is detected, it displays the form of the wiring error on the display panel.

Next, the calculating section 6 transmits an output stop signal to turn off the output from the heater in channel n, and determines whether channel n is the last channel. If channel n is not the last channel, the calculating section 6 switches from channel n to a channel n−1 and displays the form of a wiring error on the display panel, as in channel n. In this manner, the calculating section 6 detects a wiring error for all heaters (until the channel n−1 becomes the last channel).

Figure 3:
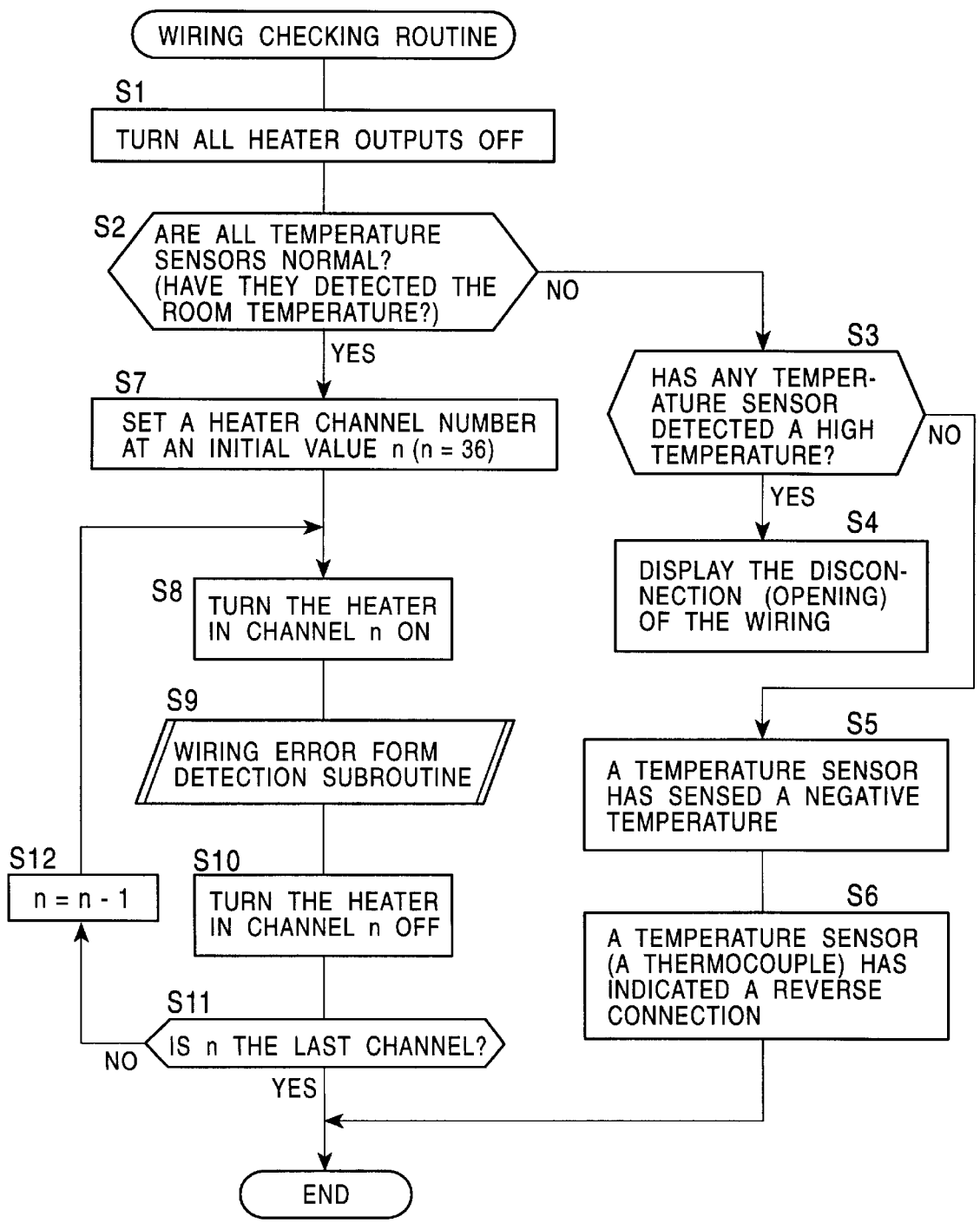
FIG. 3 is a flowchart describing the operation of the heater control apparatus.

In this configuration, the operation of the heater control apparatus is described with reference to the drawings. As shown in FIG. 3, the calculating section 6 sends the output stop signal to all heater switches to turn off the outputs from all heaters (S1), and then transmits the temperature detection command for all temperature sensors to the multiplexer 16 to sequentially obtain the detected temperatures from all temperature sensors. Once the heater temperature control panel 13 obtains the temperature data, the calculating section 6 determines whether all temperature sensors are correct (S2). This operation is performed in order to check whether the wiring is disconnected or the temperature sensor is reversely connected.

If the temperature sensors are not all determined to be correct, that is, if any temperature sensor outputs temperature data indicating a temperature different from the room temperature (S2, NO), it is determined whether this temperature is high (S3). If so (S3, YES), "wiring disconnected (open)" is displayed on the display panel (S4). The disconnection of the wiring can be detected because if the wiring is disconnected, the temperature sensor will output temperature data indicating a high temperature regardless of any increase in the heater temperature.

On the other hand, if at S3, the temperature different from room temperature is a negative temperature (S3, NO), "temperature sensor polarity reversely connected" is displayed on the display panel. The reverse connection of the temperature sensor can be detected when the sensor comprises a thermocouple, wherein the thermocouple outputs temperature data indicating a negative temperature when reversely connected.

Next, when the operator sets the heater channel number at an initial value "n" (S7), the calculating section 6 stores the initial value "n" in the heater channel number storage section 8a and transmits the output start signal to the heater switch in channel n to increase the temperature of the heater in channel n to a predetermined value (S8). The initial value "n" is determined by the number of false twisting units having a heater, but the heater control apparatus according to this embodiment is described assuming an initial value "n" of 36. In addition, the predetermined temperature must only enable confirmation that the heater in channel n and the temperature sensor in channel n are paired.

When the operator sets an initial value of 36, the output start signal is transmitted to the heater switch in channel 36, causing the temperature of the heater to rise to a predetermined value. Once the temperature of the heater in channel 36 has reached the predetermined value, the wiring error form detection subroutine 7b is executed (S9). The temperature sensor connected to the I/F section 11a detects the temperature of the heater in channel 36, and temperature data obtained through A/D conversion by an A/D converter and channel number 36 of the temperature sensor that has detected the temperature of heater channel number 36 is stored in the temperature storage section 8b.

Figure 4:
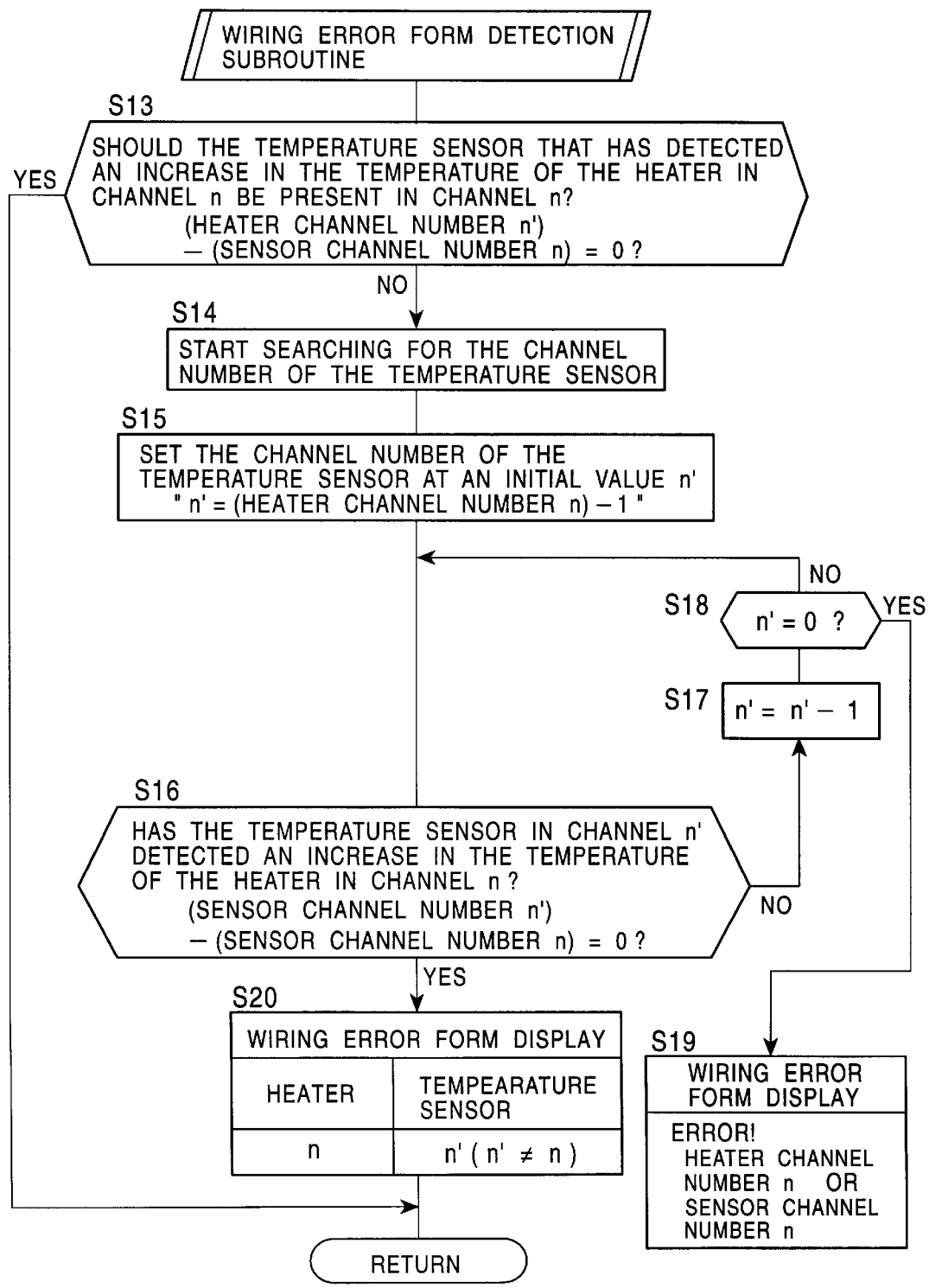
FIG. 4 is a flowchart describing the operation of the heater control apparatus.

Next, the calculating section 6 reads the temperature data from the temperature storage section 8b and sensor channel number 36, and also reads heater channel number 36 from the storage section 8a. As shown in FIG. 4, the calculating section 6 determines whether the temperature sensor that has detected a rising heater temperature in channel 36 (i.e., the temperature sensor connected to the I/F section 11a) should be present in channel 36 (S13).

Specifically, this is determined depending on whether (heater channel number n)−(sensor channel number n)=0. Since the heater channel numbers read from the heater channel number storage section 8a and the temperature storage section 8b are both recorded as 36, (heater channel number 36)−(sensor channel number 36)−0. It is thus determined that the temperature sensor that detected a higher heater temperature in channel 36 should be present in channel 36 (S13, YES). That is, the heater and temperature sensor in the 36-th false twisting unit are determined to be paired correctly (wiring check processing sequence).

When the wiring has been determined to be correct as described above, the calculating section 6 transmits the output stop signal to the heater switch in channel 36, turning it off as shown in FIG. 3 (S10). Then, it is determined whether channel 36 is the last channel (S11). If not (S11, NO), the calculating section 6 switches from channel 36 to channel 35 (S12), the output start signal is sent to the heater switch in channel 35, just as in channel 36 (S8), and the above wiring check processing sequence is repeated.

Figure 5:
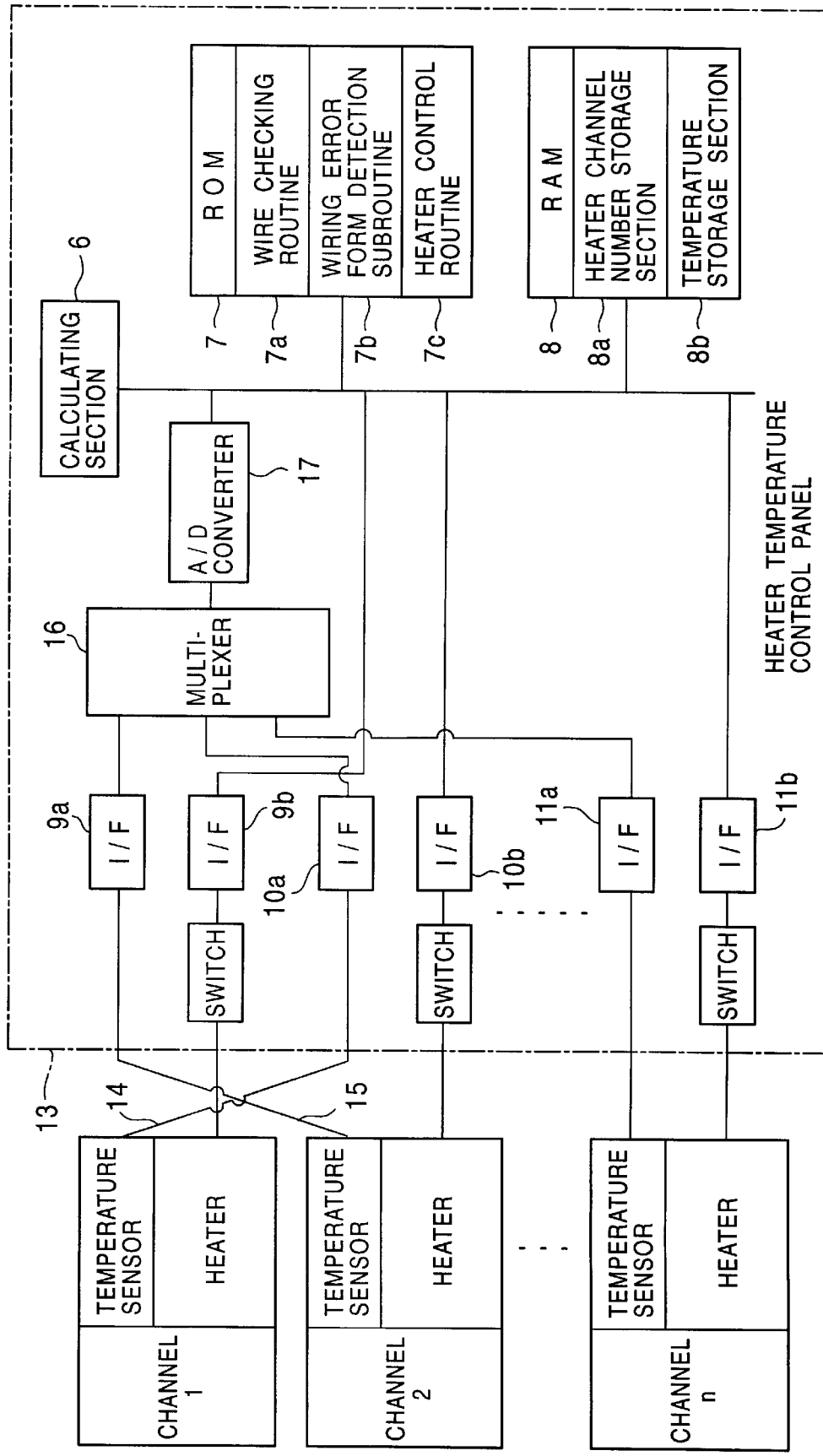
FIG. 5 describes an error in the wiring connecting the heaters and temperature sensors.

Next, FIG. 5 is used to explain an example in which this wiring check processing sequence is repeated for channels 36, 35 . . . k . . . 3, and in which a wiring error is detected in channel 2. The temperature sensor in channel 2 is connected to the I/F section 10a in FIG. 2, but the following description assumes that the temperature sensor in channel 1 is mistakenly connected to the I/F section 10a.

At S8, the calculating section 6 stores the heater channel number 2 in the heater channel number storage section 8a and sends the output start signal to the heater switch in chanel 2, thereby increasing the temperature of the heater in channel 2 to a predetermined value (S8). Once this temperature reaches the predetermined value, the wiring error form detection subroutine 7b is executed (S9). Then, the temperature sensor connected to the I/F section 10a detects the temperature of the heater in chanel 2. When the heater temperature control panel 13 obtains the temperature data, this data and the channel number 1 of the temperature sensor that has detected the temperature increase are stored in the temperature storage section 8b.

Next, the calculating section 6 reads the temperature data from the temperature storage section 8b and the sensor channel number 1, and also reads the heater channel number 2 from the heater channel number storage section 8a. As shown in FIG. 4, the calculating section 6 determines whether the temperature sensor that detected the temperature data for the heater in channel 2 (i.e., the temperature sensor connected to the I/F section 10a) should be present in channel 2 (S13). Specifically, this is determined by assessing whether (heater channel number n)–(sensor channel number n)=0, as was the case with channel 36. Since (heater channel number 2)–(sensor channel number 1)=1, the calculating section 6 determines that the temperature sensor that has detected the increased temperature in channel 2 (i.e., the temperature sensor connected to the I/F section 10a) should not be present in channel 2 (S13, NO). Next, the calculating section 6 starts to search for the channel number of the temperature sensor that detected the temperature increase in channel 2 (i.e., the temperature sensor connected to the I/F section 10a) to determine in which chanel this temperature sensor should be located (S14).

When the search for the chanel number of the temperature sensor starts, an initial value n'"n'=(heater channel number n)–1" is set as the channel number of the temperature sensor. Specifically, the initial value n'=1"n'=(heater channel number 2)–1" is set as the channel number of the temperature sensor (S15). Once the initial value n' has been set, the calculating section 6 determines whether (sensor channel number n')–(sensor channel number n)=0.

That is, the calculating section 6 determines whether the temperature sensor in channel n' has detected an increased temperature in channel n (the temperature sensor connected to the I/F section 10a) (S16). Specifically, it determines whether the temperature sensor in channel 1 has detected an increase temperature for the heater in channel 2 (S16).

Since the sensor channel number n' set as the initial value and the sensor channel number n read from the temperature storage section 8b are both "1", (sensor channel number 1)–(sensor channel number 1)=0 (S16, YES). That is, the calculating section 6 determines that the temperature sensor in channel 1 has detected an increase in the temperature of the heater in channel 2 (the temperature sensor connected to the I/F section 10a) (S16, YES).

Upon determining that the temperature sensor in channel 1 has detected an increase in the temperature of the heater in channel 2, the calculating means 6 displays the heater channel number 2 and sensor channel number 1 on the display panel not shown in the drawings (wiring error form display) (S20). Thus, the operator can determine that the second false twisting unit is wired incorrectly and that the temperature sensor in channel 1 has detected the temperature of the heater in channel 2. Accordingly, the operator can pull signal lines 15 and 14 from the I/F sections 9a and 10a, respectively, to correct the wiring easily as shown in FIG. 2.

Next, the operation of the heater temperature control panel 13 is described with reference to FIG. 4 where if at S9, no channel has indicated that the corresponding temperature sensor has detected an increase in the temperature of the heater in channel 2. The processing in S13 to S15 is similar to the corresponding processing sequence described above.

If at S16, no channel has indicated that the corresponding temperature sensor has detected an increase in the temperature of the heater in channel 2 (S16, NO), the calculating section 6 switches from channel 1 to channel 0 (S17) and determines whether the sensor channel number n' is "0" (S18). If so (S18, YES), the calculating section 6 displays the message "error! heater channel number 2 or sensor channel number 1" (wiring error form display) on the display panel (S19). This message alerts the operator that there is a defect in the heater in the second false twisting unit or the temperature sensor in the first false twisting unit.

When the form of the wiring error is displayed in S20 and S19, the output stop signal is sent to the heater switch in channel 2 to turn off the output from the heater in channel 2. When the output from the heater in channel 2 is turned off (S10), it is determined whether channel 2 is the last channel (S11). If not (S11, NO), channel 2 is switched to channel 1 (S12) to repeat the wiring check processing sequence. Since channel 1 is the last channel (S12, YES), when processing for this channel finishes, the wiring checking routine finishes (End).

The wiring checking routine finishes in this manner, confirming that all heater channels are wired correctly to operate the false twist texturing machine.

This embodiment has been described with reference to FIGS. 4 and 5 in conjunction with cases in which a wiring error has been detected in channel 2, and in which no temperature sensor detects an increase in the temperature of the heater in channel 2. If, however, a wiring error has been detected in the heater in any of channels 3 to 36, n'=one of "2" to "35" at S15 and n'=one of "1" to "34" at S18 (S18, NO). In such a case, the searching processing in S16 to S18 is repeated until the channel number n' of the temperature sensor that detected the temperature increase in channel n is determined. If the searching processing is sequentially repeated and if n'="0," that is, no temperature sensor detected a temperature increase of the heater in channel n, then the message "error! heater channel number n or sensor channel number n" is displayed on the display panel, as described above.

n' is set at (heater channel number n)–1 at S15 in order to increase searching efficiency by checking only those sensor channel numbers that have not yet been checked. If n'=36, those sensor channel numbers that have already been checked are checked again during searching processing in S16 to S18, thereby reducing searching efficiency.

Since the ROM 7 according to this embodiment stores not only the wiring checking routine and the wiring error form detection subroutine but also the heater control routine, the heater temperature control panel 13 according to this embodiment executes not only wiring checking and wiring error form detection processing according to this embodiment but also the control of the heater temperature during the normal operation of the draw texturing machine, that is, the control of output to the heater depending on the deviation between the temperature detected by the temperature sensor and the set temperature.

The present invention is adapted to comprise a large number of heaters each provided so as to correspond to each of a large number of yarn processing units installed in parallel, a large number of temperature sensors each provided so as to pair with each of the heaters and detecting the temperature of the heaters, a large number of switches, each provided so as to pair with each of the heaters and to turn on and off the power to the heaters, a switch control means for sequentially turning on and off the large number of switches to sequentially provide power to the large number of heaters and a combination determination means for determining whether a temperature sensor that has detected the temperature of an activated heater should be paired with this heater.

This configuration makes it possible to determine whether a larger number of heaters and temperature sensors are wired together in such a way as to be correctly paired, thereby enabling an operator to easily check whether the wiring is correct in order to prevent yarn from being melted due to an excessive increase in the temperature of the heaters caused by incorrect wiring.

In addition to the configuration of the above mentioned invention, the present invention is configured so that the combination determination means has an operative calculating means if it determines that the heaters and the temperature sensors are incorrectly coombined, after which it calculates a value indicating the temperature sensor that has detected the temperature of the activated heater.

This configuration enables the calculation of the value indicating the temperature sensor that has detected the temperature of the activated heater, thereby informing the operator of the wiring error form.

In addition to the configuration of the above mentioned invention, the present invention is adapted to include a display means for displaying, in comparative format, the value indicating an activated heater and a value indicating the temperature sensor that has detected the activated heater.

This configuration enables the operator to determine the form of wiring errors, so that they can be promptly and reliably corrected.

In addition to the configuration of the above mentioned invention, the present invention is adapted to include an output error detection means used to turn off all heaters, in order to detect output errors from the temperature sensors.

This configuration enables an operator to easily confirm during installation of the heaters whether the outputs from the temperature sensors are correct, thereby preventing the temperature sensors from issuing incorrect output during operation of the textile machine.

I claim:

1. A heater control apparatus for a textile machine characterized in that the apparatus comprises:

a large number of heaters each provided so as to correspond to each of a large number of yarn processing units installed in parallel;

a large number of temperature sensors each provided so as to pair with each of said heaters and detecting the temperature of said heaters;

a large number of switches each provided so as to pair with each of said heaters and turning on and off the power to said heaters;

a switch control means for sequentially turning on and off said large number of switches to sequentially provide power to said large number of heaters; and a combination determining means for determining whether a temperature sensor that has detected the temperature of an activated heater should actually be paired with said heater.

2. A control apparatus for a textile machine according to claim 1 characterized in that said combination determining means has a calculating means that becomes operative if it determines that said heaters and said temperature sensors are incorrectly combined together, to calculate a value indicating said temperature sensor has been activated.

3. A heater control apparatus for a textile machine as in claim 2 characterized in that the apparatus has a display means for displaying, in a comparative format, the value indicating said heater has been activated and a value indicating said temperature sensor has detected said activated heater.

4. A heater control apparatus for a textile machine as in any one of claims 1 to 3 characterized in that the apparatus has an output error detection means for turning off all heaters, in order to detect output errors from said temperature sensors.

5. A heater control apparatus for a textile machine as in any one of claims 1 to 3 characterized in that the apparatus has a storage means in which a stored heater control routine controls the heaters during normal operation.

* * * * *